United States Patent
Delbreil et al.

(10) Patent No.: US 9,417,766 B2
(45) Date of Patent: Aug. 16, 2016

(54) BEVERAGE PREPARATION MACHINE WITH TOUCH MENU FUNCTIONALITY

(71) Applicant: NESTEC S.A., Vevey (CH)

(72) Inventors: Marc Delbreil, Bulle (CH); Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/514,821

(22) Filed: Oct. 15, 2014

(65) Prior Publication Data

US 2015/0027316 A1    Jan. 29, 2015

Related U.S. Application Data

(63) Continuation of application No. 13/513,777, filed as application No. PCT/EP2010/068182 on Nov. 25, 2010, now Pat. No. 8,876,000.

(30) Foreign Application Priority Data

Dec. 2, 2009    (EP) ...................................... 09177753

(51) Int. Cl.

| | |
|---|---|
| *A47J 31/44* | (2006.01) |
| *G06F 3/048* | (2013.01) |
| *G06F 3/0482* | (2013.01) |
| *G07F 9/02* | (2006.01) |
| *G07F 13/06* | (2006.01) |
| *A47J 31/46* | (2006.01) |
| *G06F 3/0481* | (2013.01) |
| *G06F 3/0488* | (2013.01) |

(52) U.S. Cl.
CPC ............... *G06F 3/0482* (2013.01); *A47J 31/46* (2013.01); *G06F 3/0488* (2013.01); *G06F 3/04817* (2013.01); *G07F 9/02* (2013.01); *G07F 9/023* (2013.01); *G07F 13/065* (2013.01); *A47J 31/4492* (2013.01); *G06F 3/048* (2013.01)

(58) Field of Classification Search
CPC ....... G06F 3/048; G07F 17/16; A47J 31/4492
USPC ........................................................ 235/381
See application file for complete search history.

(56) References Cited

U.S. PATENT DOCUMENTS

| | | | |
|---|---|---|---|
| 4,377,049 | A | 3/1983 | Simon |
| 4,458,735 | A | 7/1984 | Houman |
| 4,554,419 | A | 11/1985 | King |
| 4,767,632 | A | 8/1988 | Meier |

(Continued)

FOREIGN PATENT DOCUMENTS

| | | |
|---|---|---|
| AT | 410377 | 4/2003 |
| CH | 682798 | 11/1993 |

(Continued)

*Primary Examiner* — Toan Ly
(74) *Attorney, Agent, or Firm* — K&L Gates LLP

(57) ABSTRACT

The present invention relates to a beverage preparation machine, comprising a memory for storing icons, said icons being divided into at least two menu level groups, whereby each icon indicates a selectable menu function of the machine. The machine further comprises a display for displaying: in a first operation mode a first group of icons adjacent a main portion of the display; and in a second operation mode one group of icons as currently selectable icons on said main portion of the display. A touch pad is adapted to accept a touch operation for switching between the first and second operation mode.

19 Claims, 6 Drawing Sheets

(56) References Cited

U.S. PATENT DOCUMENTS

| | | | |
|---|---|---|---|
| 4,954,697 | A | 9/1990 | Kokubun |
| 5,335,705 | A | 8/1994 | Morishita |
| 5,372,061 | A | 12/1994 | Albert |
| 5,375,508 | A | 12/1994 | Knepler |
| 5,645,230 | A | 7/1997 | Marogna |
| 5,731,981 | A | 3/1998 | Simard |
| 5,836,236 | A | 11/1998 | Rolfes |
| 5,959,869 | A | 9/1999 | Miller |
| 6,182,555 | B1 | 2/2001 | Scheer |
| 6,312,020 | B1 | 11/2001 | Ketcham |
| 6,354,341 | B1 | 3/2002 | Saveliev |
| 6,759,072 | B1 | 7/2004 | Gutwein |
| 7,806,294 | B2* | 10/2010 | Gatipon ............... B67D 1/0022 222/1 |
| 8,037,811 | B2 | 10/2011 | Bunn |
| 2004/0166937 | A1 | 8/2004 | Rothschild et al. |
| 2005/0210410 | A1* | 9/2005 | Ohwa et al. .................... 715/821 |
| 2007/0157821 | A1* | 7/2007 | Panesar et al. .................. 99/279 |
| 2007/0202234 | A1* | 8/2007 | Ludwig ................ A47J 31/402 426/580 |
| 2008/0250935 | A1* | 10/2008 | Van Belleghem ... A47J 31/0642 99/289 R |
| 2008/0275791 | A1* | 11/2008 | Youssef ............... G06Q 10/087 705/22 |
| 2011/0108162 | A1* | 5/2011 | Yoakim .................. A47J 31/52 141/94 |

FOREIGN PATENT DOCUMENTS

| | | |
|---|---|---|
| DE | 4429353 | 2/1996 |
| DE | 20200419 | 7/2002 |
| DE | 202006109039 | 4/2007 |
| EP | 1302138 | 4/2003 |
| EP | 1448084 | 8/2004 |
| EP | 1676509 | 7/2006 |
| EP | 2076000 | 7/2009 |
| EP | 2105826 | 9/2009 |
| FR | 2624844 | 6/1989 |
| GB | 2397510 | 7/2004 |
| WO | 9950172 | 10/1999 |
| WO | 2004030435 | 4/2004 |
| WO | 2004030438 | 4/2004 |
| WO | 2006063645 | 6/2006 |
| WO | 2006090183 | 8/2006 |
| WO | 2007003062 | 1/2007 |
| WO | 2007003990 | 1/2007 |
| WO | 2008104751 | 9/2008 |
| WO | 2008138710 | 11/2008 |
| WO | 2008138820 | 11/2008 |
| WO | 2009016490 | 2/2009 |
| WO | 2010020367 | 2/2010 |

* cited by examiner

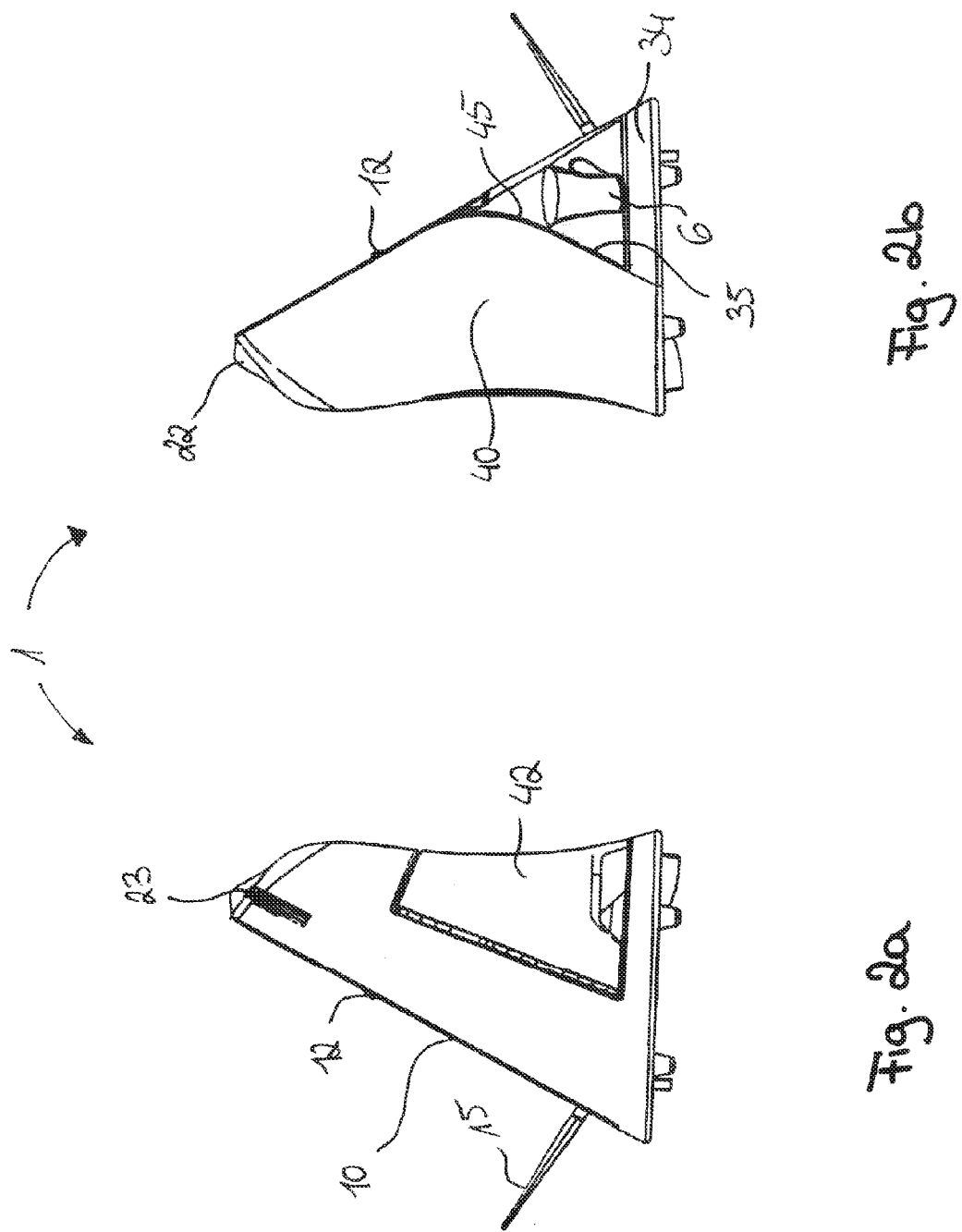

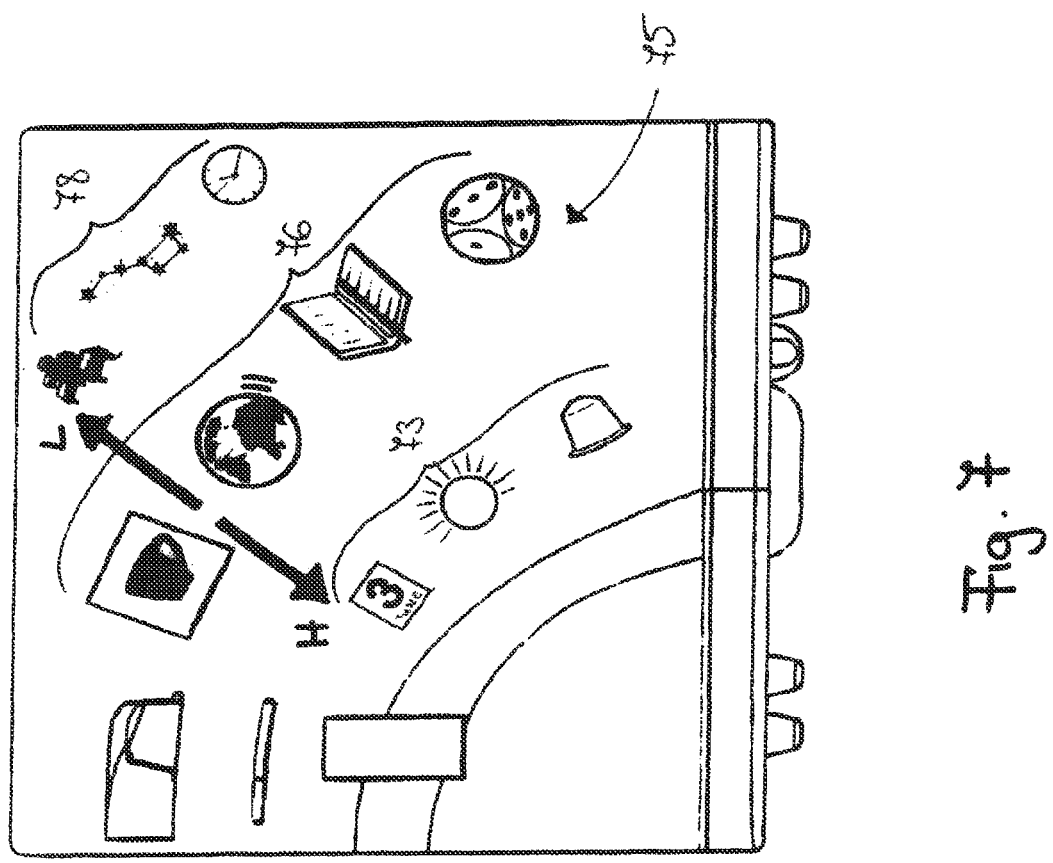

BEVERAGE PREPARATION MACHINE WITH TOUCH MENU FUNCTIONALITY

PRIORITY CLAIM

The application is a continuation of U.S. application Ser. No. 13/513,777, filed Jun. 4, 2012, which is a U.S. national stage filing of International Appl. No. PCT/EP10/068182, filed Nov. 25, 2010, which claims priority to European Patent Appl. No. 09177753.2, filed Dec. 2, 2009, the entire contents of which are expressly incorporated herein by reference thereto.

FIELD OF INVENTION

The field of the invention relates to a beverage preparation machine with touch menu functionality and to a program stored on a memory device and executable by a control unit of a beverage preparation machine to provide a touch menu functionality.

For the purpose of the present description, a "beverage" is meant to include any liquid food, such as tea, coffee, hot or cold chocolate, milk, soup, baby food or the like. A "capsule" is meant to include any pre-portioned beverage ingredient within an enclosing packaging of any material, in particular an air tight packaging, e. g. plastic, aluminum, recyclable and/or bio-degradable packaging and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee or other beverage preparation machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,731,981, U.S. Pat. No. 5,645,230, U.S. Pat. No. 5,836, 236, U.S. Pat. No. 5,959,869, U.S. Pat. No. 6,182,555, U.S. Pat. No. 6,354,341, U.S. Pat. No. 6,759,072, US 2007/ 0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

Today's beverage preparation machines provide an increasing number of different functions going even beyond the pure preparation of the beverage. For example, beverage preparation machines that can be integrated into a network such as the internet are well known. Such a connection to a network allows additional internet and network functions.

However, due to an increased number of possible functions beverage preparation machines suffer from the problem that it is getting more difficult for the user to keep an overview over the possible functionalities and to select the function.

Several beverage dispensers having a screen for displaying icons representing selectable functions are known from the art, for example from documents WO 2007/003062 or WO 2009/016490. However, these devices do not provide any solution to solve the problem of adapting the user interface to the current needs and the behavior of the user, and more generally to the aforementioned issue of presenting clearly and intelligibly an important number of possible functions.

SUMMARY OF THE INVENTION

It is therefore and object of the present invention to improve the prior art.

It is a preferred object of the present invention to provide a method for operating a menu structure for a beverage preparation machine as well as a beverage preparation machine having a touch menu functionality, which is comfortable and user-friendly. More specifically, it is an object to provide a menu structure which allows the user to easily keep the overview over the different functions and to simplify the selection process. Further, it is an object of the present invention to make the menu structure and the selection of functions for the user more intuitive.

According to a first aspect, the present invention relates to a beverage preparation machine, comprising a memory for storing icons, said icons being divided into at least two menu level groups, whereby each icon indicates a selectable menu function of the machine, a display for displaying: in a first operation mode a group of icons adjacent a main portion of the display, optionally this main portion being empty or displaying an image that is arbitrary or different to said icons; and in a second operation mode one group of icons as currently selectable icons on said main portion of the display, and a touch pad for accepting a touch operation for switching between the first and second operation mode.

In an embodiment, the main portion of the display is extending sensibly over the majority of the display. Furthermore, the icons in the second operation mode can be displayed larger than in the first operation mode.

According to a further aspect, the present invention relates to a program stored on a memory device and executable by a control unit of a beverage preparation machine (1) for providing touch menu functionality, wherein said program when being executed is arranged to perform the steps of dividing icons into at least two menu level groups, whereby each icon indicates a selectable menu function of the machine, displaying: in a first operation mode a first group of icons adjacent a main portion of the display, optionally said main portion being empty or displaying an image (74) that is arbitrary or different to said icons; in a second operation mode one group of icons as currently selectable icons on said main portion of the display, and accepting a touch operation on a touch pad for switching between the first and second operation mode. In an embodiment, the main portion of the display is extending sensibly over the majority of the display. Furthermore, the icons in the second operation mode can be displayed larger than in the first operation mode.

According to another aspect, the present invention relates to a program, in particular as described above, for providing a touch menu functionality for a beverage preparation machine, comprising the steps of dividing icons into at least two menu level groups, each icon being associated with a function of the machine selectable by a user via said icon, whereby the group allocation and/or the size of the icons depends on an actual or expected frequency of selection of each icon by a user.

These programs for providing touch menu functionality comprise electronic data-processing program code instructions, intended to be executed by a processing unit such a processor or a controller. Consequently, the invention relates also to programs on an information support, for providing touch menu functionality. These programs may use any programming language, and may be in the form of source code, object code, or intermediate code between source code and object code, such partially compiled code, or any suitable other form.

The invention relates also to an information support readable by a beverage machine, and on which are stored instructions of the programs as mentioned above. The information support may be any suitable device capable of storing said programs. For example, it may comprise storage means, comprising a CD-ROM, USB key, FLASH memories, or a ROM of a microelectronic circuit, or a magnetic storing means, like a floppy or hard drive. Moreover, the information support may be a transmissible support, such as an electrical or optical signal, which can be transported by an optical or electrical wire, by radiofrequency means or by any suitable coupling means. The program may be in particular downloaded from a network connected to Internet.

The information support may also be an integrated circuit in which the programs are incorporated, the circuit being adapted to execute or to be used to execute these programs.

According to yet a further aspect, the present invention relates to a beverage preparation machine comprising a display, a touch pad and a control unit being designed to support such a program.

Further features, advantages and objects of the present invention will become evident by means of the Figures of the enclosed drawings as well as by the following detailed explanation of illustrative-only embodiments of the present invention.

BRIEF DESCRIPTION OF THE DRAWINGS

The invention will now be described with reference to schematic drawings, wherein FIGS. 1a, 1b, 2a and 2b show different perspective views of a beverage preparation machine according to the present invention, FIGS. 5 to 7 show views of different display images of a beverage preparation machine according to the present invention.

DETAILED DESCRIPTION

Figure 1B:
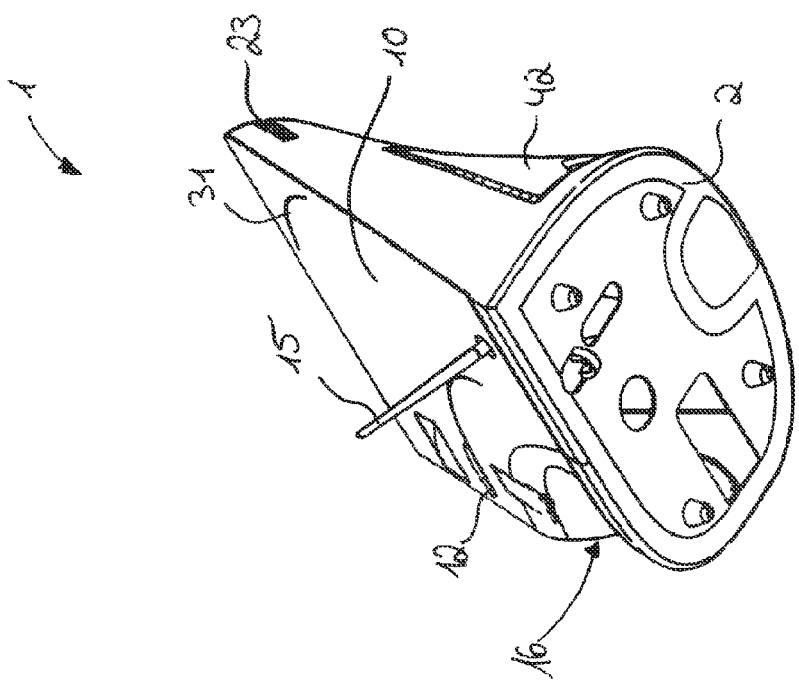

The machine according to the present invention can be a coffee, tea or soup machine, in particular a machine for supplying a beverage or liquid food by passing hot or cold water or another liquid through a capsule containing an ingredient of the beverage or liquid food to be supplied, such as ground coffee.

For example, the preparation machine comprises: an ingredient processing arrangement including one or more of a liquid reservoir, liquid circulation circuit, a heater, a pump and a beverage preparation unit arranged to receive capsules for use and evacuate capsules upon use; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550 and in WO 2009/130099, which are incorporated herein by reference.

The machine may include an interface as described in PCT/EP09/058540 and/or be in a network for reordering capsules as described in EP 09169800.1.

The machine may comprise a user-interface screen for providing information to the user and/or for accepting input by the user. The user-interface screen can be a touch-sensitive screen and/or comprise touch-sensitive input parts. The machine may have a user-input device, such as a touch pad, one or more buttons and/or switches or similar devices known in the art. The user-interface screen can be stylus sensitive.

A stylus may for instance be used to select predefined options displayed on the interface-screen or to write notes and messages on the user-interface screen that may be stored by the machine and re-accessible later. Hence, the screen may be used as a substitution for a post-it.

According to the present invention, the liquid food or beverage preparation machine has an interface for connection to a remote network, such as a network for accessing remote data displayable on the user-interface screen and/or for transferring local data acquired via the user interface screen, in particular a network for: supplying visual and/or audio information in relation with a liquid food or beverage that can be requested by the user; and/or for ordering, in particular from a remote supplier, goods such as liquid food or beverage ingredients or a service related to this machine by using the user-interface screen.

Hence, the user may be given the technical possibility to order directly through the beverage preparation machine liquid food or beverage ingredients that are missing or at a low level, or request directly through this machine the most up to date information on a particular item, in particular a liquid food or beverage he has requested or intends to request the machine to prepare or order from the supplier.

Moreover, the user-interface screen can be arranged to perform at least one function selected from: displaying information to the user regarding a parameter of the machine that requires a user intervention, displaying locally stored and/or remotely emitted graphic or text matter, a notepad function, and a visual ambiance generator, for instance by displaying appropriate pictures or moving color shapes, for instance of the screen-saver type.

In order to noticeably affect the ambiance surrounding the machine by visual effects, the user-screen has to dominate the user-visible part of the machine. An interface screen of small size and/or lost somewhere on the user-visible part of the machine will not provide an optimal ambiance effect.

Furthermore, the liquid food or beverage preparation machine may include a sound input and/or output device. The sound device can be arranged to cooperate with the user-interface screen, in particular a sound device arranged to cooperate functionally with the screen, such as a sound device for providing melodic acoustic feed back in reaction to a user-input on the user-interface screen and/or cooperating with the screen so that harmonious visual feed-back is generated on the user-interface screen in reaction to an audio signal. The sound device may include a voice recognition arrangement so as to be able to receive vocal user-commands and/or to link a particular user profile from a voice analysis.

For example, the user-interface screen may be arranged to display a movie, news, weather forecast, stock exchange information or anything alike while the machine is preparing a liquid food or beverage, so that the user does not have to wait until the liquid food or beverage is prepared to move on to such activities but can do them right from the beginning, with a comfortable interface screen whose functionalities go significantly beyond mere input and/or output of data.

Such liquid food or beverage preparation machines are particularly handy for preparing a liquid food or beverage during an on-going broadcasted radio or TV program. The user may thus get himself a liquid food or beverage while he is following such a program on an ordinary TV or radio and still continue to follow the program on the beverage preparation machine. Hence, the user will not be attempted to wait the end of the program or an advertising break. The beverage preparation machine may include a receiver that is capable of reacting to a remote control device, such as an IR or radio remote control device, in particular a remote control device compatible with a radio or television, so that the user may start-up the food or beverage preparation machine from a distance, in particular while he is sitting in front of his TV or nearby the radio. The liquid food or beverage preparation machines may of course be connected to a DVD or other media source so that the user can follow his favorite programs while he is preparing a liquid food or beverage.

The machine can be substantially formed by a main body having a rectangular front side being dominated by the user-interface screen and a foot portion larger than the top portion, so that the main body is tapering from the foot portion to the top portion. The main body may include at least one of: a drip tray having a support member for a receptacle to be filled with a liquid food or beverage, a capsule collector, and a liquid supply reservoir such as a water reservoir.

Moreover, the machine may have a liquid food or beverage outlet located above an area for receiving a receptacle to be filled, the outlet preferably being hidden by the user-interface screen. For instance, the outlet is located perpendicularly behind the user-interface screen. In fact, the entire area or a substantial part thereof can be located perpendicularly behind the user-interface screen.

Thus, in addition of providing a user-interface screen configuration on the machine that naturally and durably captures the user's attention, the machine's outlet, and optionally the receptacle located thereunder, may be hidden from the user's visual field so as avoid distraction of the user's attention by parts and/or operations of the machine other than those relating to the user-interface screen.

As already mentioned, the present invention relates to a machine connectable to a data-exchange network, the machine being configured for preparing a beverage in particular from a pre-portioned beverage ingredient in a capsule.

For this purpose, the machine comprises a communication module for connecting the machine to said network via a wired or wireless connection. The network to which the communication module is connectable may be the internet, an intranet, GSM network, UMTS network, Bluetooth network, infrared (IR) or a similar network to which one or more distant computers, servers and terminals are connected for communicating with the communication module of the beverage preparation machine. Hereby, the term "network" is intended to refer to a system comprising the machine according to the present invention and at least one further device, which are connected to each other via a communication link for one-directional or bi-directional communication. In case that a connection to more than one device is provided, the machine can also be connected to different devices via different types of communication networks.

Without controlling or participating to the control of the ingredient processing arrangement, the communication module may be configured in the beverage preparation machine to monitor certain aspects of the machine and, in particular, communicate such aspects onto the network to a remote server.

The machine further comprises a control unit for controlling all processes within the machine. In one embodiment, the control unit is arranged to communicate data to the communication module, the data relating to at least one of: the beverage preparation process; the ingredient processing arrangement; the control unit and/or beverage preparation settings. This information may then be communicated (or not) to a distant server and be processed for general or particular commercial or servicing or repair or counseling purpose.

In an even safer embodiment, the control unit is prevented from communicating with the communication module. In this case, the communication is not even unidirectional like above but inexistent. Hence, the control unit is configured to receive no signal at all from the communication module not even a signal for an information request. In this embodiment, no data communication channel is needed between the control unit and the communication module.

Typically, the ingredient processing arrangement comprises one or more sensors for measuring parameters of the status of the ingredient processing arrangement and/or the beverage preparation process. For instance, such sensors may include at least one of: temperature sensors, a pressure sensor, a flowmeter, an electric power sensor, an overheat sensor, a scale sensor, a water level sensor, an ingredient recognition sensor, etc. . . . Such sensors are usually connected to the control unit.

In an embodiment, the communication module can be arranged to receive information from at least one of the sensor(s). The communication module may be directly connected to the sensors, usually in parallel to the control unit, or it may be indirectly connected to the sensor(s) via the control unit and typically be communicated a sensor-related information after processing by the control unit.

Normally, the control unit is connected to a beverage preparation user-interface. The user would use this user-interface to operate the ingredient processing arrangement via the control unit.

Typically, the communication module is connected to a communication user-interface. The user would use this user-interface to retrieve information from the network or retrieve information therefrom.

Such user-interfaces may include screens and touch screens, buttons, switches, etc. . . . as known in the art.

Preferably, the control unit is connected to a beverage preparation user-interface and the communication module is connected to a communication user-interface, the beverage preparation user-interface and the communication user-interface being juxtaposed. In particular, the beverage preparation user-interface can be flush with the communication user-interface. The beverage preparation user-interface and the communication user-interface may be disposed in a single user-interface canvas. Hence, the disposition of the user-interfaces may be such as to appear like a single interface providing all the user-access to the control unit and the communication module.

Whereas the control unit and the communication module may be digitally and/or physically, entirely or partly, separated within the machine, the corresponding user-interfaces may be configured as an apparent single interface. Hence, the user is confronted with a single or concentrated user-interface arrangement to avoid the dispersion of his/her attention all over the beverage preparation machine.

Typically, the beverage preparation machine comprises a housing for housing: the ingredient processing arrangement; the control unit; and the communication module. This housing would normally also bear the user-interfaces.

For instance, the communication module is arranged to receive from the network and communicate via user-communication means, such as a display and/or loudspeaker, information relating to at least one of: a need to carry out a particular service; a need to repair said machine; and information on a particular ingredient that is being processed in said machine. When the communication module is configured to monitor the machine operation and/or components of the machine, the corresponding information may be communicated to a distant server of the network for evaluation and generation of suggestions to the user, for instance, via the communication module. For example, via appropriate sensor systems, the communication module may monitor the ingredient consumption and suggest timely reordering when the stock of ingredient is low or send general information regarding the ingredient or beverage that is being processed for display on the machine. Instead of a mere suggestion to reorder ingredients, e.g. proportioned ingredients capsules, the system may be configured to proceed to automatic reordering when the ingredient stock is low.

The communication module may be arranged for remote monitor of the service periods, for instance for carrying out a descaling process or for general maintenance. The communication module may communicate various parameters of the ingredient processing arrangement and the control unit for diagnosis purposes and/or for carrying out a market survey as to the user's preferences, for instance the actually used ratios of different ingredients. Hence, a distant server may monitor the preferred volume of beverage dispensing with certain ingredients, etc. . . .

More generally, the communication module may be arranged to receive from the network and communicate via user-communication means, such as a display and/or loudspeaker, information relating to: handling of this type of machine by a user, e.g. provide an on-line user manual and/or beverage recipes; advertising relating to beverage preparation machines, accessories, one or more ingredients that are being processed or related products; general information relating to one or more ingredients for the beverage processing; and visualization and/or music for generating an ambiance relating to such beverages or preparations thereof or consumptions thereof; and news and/or weather forecast, etc. . . . . For example the communication module with the appropriate user-interface may be configured to permit distant ordering of ingredients via the network.

The beverage preparation machine can be arranged to automatically monitor the capsule consumption and send a capsule order to the supplier server whenever the automatic monitoring indicates a reaching of a shortage of consumable ingredient capsules at the customer location, the supplier server being arranged to receive the capsule order and to generate a corresponding instruction to prepare a shipment of a new stock of capsules for supply to the customer.

The beverage preparation machine may be arranged to communicate automatically the capsule consumption to the supplier server that is arranged to automatically monitor the capsule consumption and to generate the above instruction.

The machine's capsule extraction unit can be arranged to receive different types of ingredient capsules for preparing different beverages. For example, the extraction unit is arranged for receiving different coffee capsules types selected from capsules of *arabica, robusta, canefora*, etc. . . . and blends thereof, e.g. the NESPRESSO™ capsule ranges of capsule types, of the in-home or the out-of-home beverage preparation machine standards.

In an embodiment, the beverage preparation machine has an automatic capsule recognition arrangement.

For example, the capsule recognition system is of the type disclosed WO02/28241 which discloses a coffee machine using capsules with a machine interpretable feature that can be read automatically by the machine via a sensor. The machine interpretable feature on the capsule may include one or more of a color, a shape, a glyph, a text string a barcode, a digital watermark, symbols, notches, grooves or holes.

For instance, the capsule extraction unit is arranged to receive different types of ingredient capsules for preparing different beverages, the automatic capsule recognition arrangement being arranged to identify the type of the capsules that are being used.

Indeed, when different capsule types are likely to be used in the same extraction unit, it is not sufficient to count the number of extraction processes carried out to derive the remaining capsule stock. The types of capsules should be identified by the machine so as to provide a differentiated management system aligned to the different capsule types.

Figure 1A:
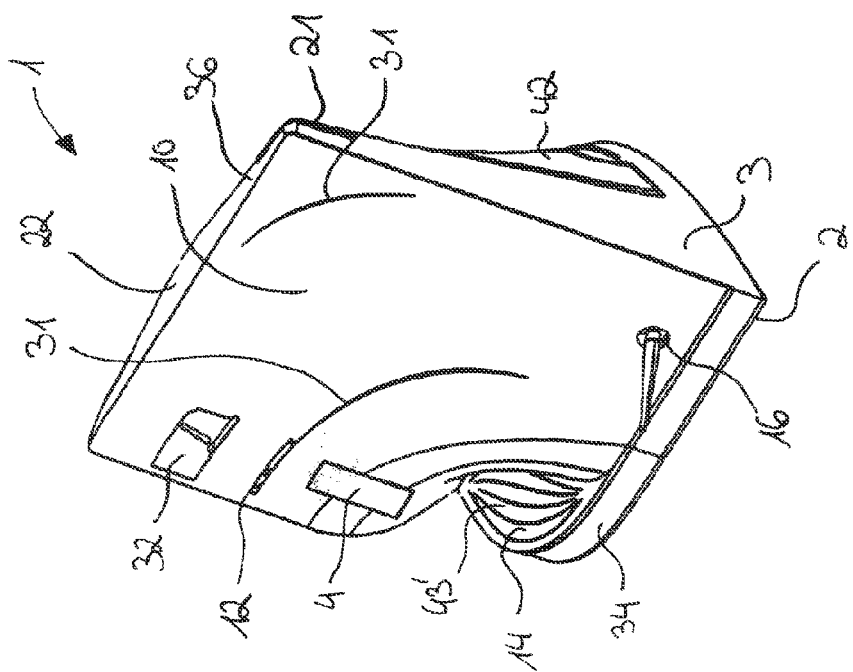

In the following with reference to FIGS. 1*a*, 1*b*, 2*a* and 2*b* the beverage preparation machine 1 according to the present invention and its basic functionalities will be described. Hereby, FIG. 1*a* is a perspective top view of the beverage preparation machine 1, FIG. 1*b* is a perspective bottom view, FIG. 2*a* is a side view on a first side of the beverage preparation machine 1 and FIG. 2*b* is a side view on the second side of the beverage preparation machine.

In the following the machine 1 will be described as coffee preparation machine, however, it is noted that the present invention is not limited to a coffee preparation machine but comprises any other type of beverage preparation machine as previously explained.

The machine 1 has an arrangement 40 for processing one or more beverage ingredients to dispense a beverage, such as coffee. Arrangement 40 includes a reservoir 42 for liquid, preferably water, connected to a liquid circulation circuit with a pump, a heater and a coffee brewing unit, as known in the art. The brewing unit can be connected to a handle 4 pivotally mounted at the housing 3 of the machine 1. The handle 4 is arranged to allow introduction, extraction and removing of a capsule containing a ground coffee. Upon extraction, capsules are evacuated to a used capsule collector after activating the handle 4 again.

Additionally, machine 1 has a top portion 36 which may be used for holding spare cups. Top portion 36 may include a heating arrangement to preheat such spare cups. The cup heater may be of the resistive type, in particular a vapor circulation cup heater as known in the art, or any other suitable heating system. A spare capsule receptacle may also be located on top portion 36 of machine 1 for storing unused capsules.

Moreover, machine 1 has an outlet 45 from which the prepared beverage is dispensed into a receptacle or cup 6 placed underneath the outlet 45, as shown for example in FIG. 2b. A drip tray arrangement 34 is provided under outlet 45, for instance of the type disclosed in EP 1731065. For positioning cup 6 under outlet 45, drip tray may include a positioning arrangement at its surface 14 and/or walls 35 delimiting dispensing cavity may be positioned relative to outlet 45 to serve as references for a cup positioning, i.e. so that a cup 6 may simply be pushed against walls 35 to be properly positioned under outlet 45. Also provided is a used capsule collector (not shown in the Figures) in a central part of machine 1 for collecting used, extracted capsules.

The machine further comprises a screen or display 10. Preferably, the display 10 is a touch sensitive screen and may be operated by finger contact and/or with a stylus 15. Preferably, the stylus 15 when not being used can be placed into a corresponding recess 16 within the display 10 or any other part of the machine 1.

Furthermore, display 10 is associated with a pair of buttons 12, for example for quick operation of machine 1 without having to access display 10. Moreover, in a preferred embodiment, display 10 includes a touch sensitive surface for navigating through pages and menus displayable on display 10.

Display 10 may be arranged to display various information and/or visual effects, as for example mentioned above, including network information when the machine is connectable to a user-network. Moreover, machine 1 may include a sound generating arrangement with loudspeakers and/or microphone and be a true multimedia interactive device, as discussed above. The machine 1 thereby may be used to contribute to the ambience.

In addition to display 10 and/or housing 3 may in particular have a series of holes 31 on its lateral, rear and/or upper sides, in particular within display 10, for the emission of light, of various colors, to create such an ambiance. For this purpose LEDs of various can be provided within the holes 31.

Unlike prior art beverage preparation machines, drip tray 34, capsule receptacle and reservoir 42 are removable from the machine 1, in a movement underneath the display 10 and that goes away from display 10 and/or generally parallel to the foot portion 2 of the machine 1. The same applies to reservoir 42, which preferably is provided at the back of the machine beyond the display 1. It follows that during use and after use, when the machine is serviced, e.g. drip tray 34 emptied, display is not exposed to parts of machine 1 that might project liquid, such as liquid food or beverage, against screen 10.

Furthermore, machine 1 has a capsule inlet arrangement 32 for the supply of capsules containing an ingredient of the liquid food or beverage to be prepared, such as coffee. The capsule inlet arrangement 32 can be either provided on the lateral side of the machine or can be provided within the display 10. Preferably, the capsule inlet arrangement 32 is a recess within the display 10 having the shape of a capsule or any other object related to the prepared beverage.

The display 10 of the machine has not an entirely flat surface but on one side when approaching the foot portion 2, provides a recess. The recessing walls 35 of the display 10 together with the cup support 14 of the drip tray 34 thus provide a cavity 16 into which the cup 6 can be placed to be filled with the beverage dispensed from the outlet 45. To deemphasize the liquid food or beverage visual aspect of machine 1, the walls 35 of the display 10 within the cavity 16 can be used like a normal display, so that every object and/or image displayed on the display 10 extends into the cavity walls 35.

On the top portion 26 or on any other part of the machine, a touch sensor 22 can be provided enabling the user to control the machine and/or to navigate through the menu functions by carrying out a corresponding touch operation on the touch sensor 22. In case that the display 10 is a mere display and not a touch screen, the touch sensor 22 will make the control of the machine easier and more intuitive for the user. In case that the display 10 is a touch screen, then the user has the choice whether to use the display 10 or the touch sensor 22 for carrying out the touch operation. However, it might be advantageous to use the touch sensor 22 instead of the touch screen to avoid damage or contamination on the display 10.

The machine 1 can further comprise a card reader/writer 23. The card reader/writer 23 can either be a slot, into which a card can be inserted to carry out a reading and/or a writing operation on the card, the card reader/writer 23 can be a wireless interface enabling a wireless communication with a card, e.g. a radio frequency identification RFID card, or a combination thereof.

In order to provide an adjusted filling of the cup, an automatic filling system with a control of the level of fill may be implemented into the machine, for instance of the type disclosed in U.S. Pat. No. 4,458,735, WO97/25634 and WO99/50172.

Figure 3:
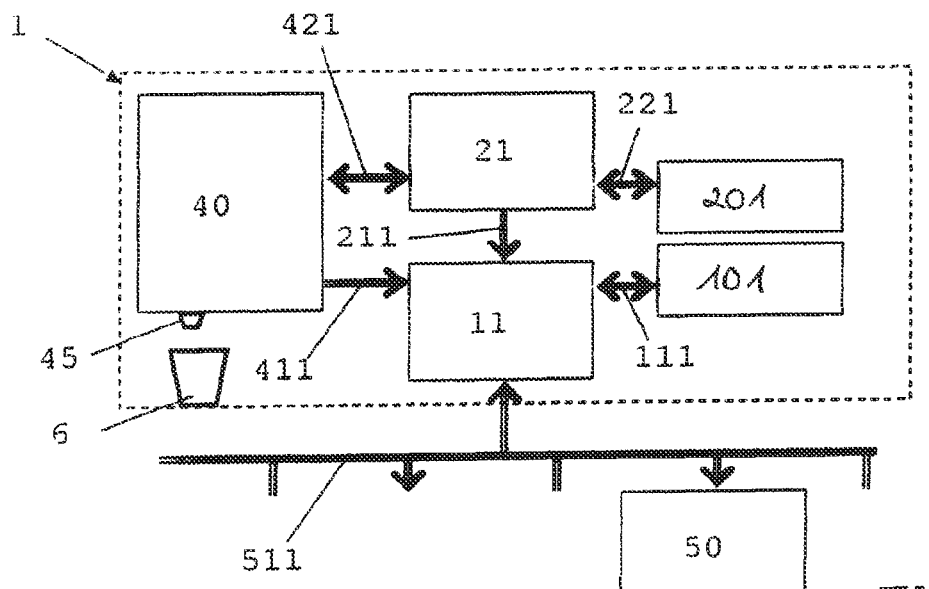
FIG. 3 shows a block diagram showing schematically the functional architecture of a beverage preparation machine according to the present invention being connected to a network.

FIG. 3 shows a functional block diagram of a beverage preparation machine 1 according to the present invention which is connected to a network 511.

Beverage preparation machine 1 includes a control unit 21 connected to a user-interface 201 via a bi-directional data communication channel 221. Control unit 21 is connected to the ingredient processing arrangement 40 for controlling the processing of the beverage ingredients. Typically, control unit 21 will control the powering of a heater and a pump and adjust the powering based on measured parameters of the beverage preparation process via sensors, such as temperature sensors, pressure sensors and flowmeters. Moreover, the control of the components of the ingredient processing arrangement 40 may be adjusted to the type of ingredient capsule extracted upon automatic recognition thereof via a capsule recognition system as known in the art, for instance an electromagnetic, mechanical, color or barcode recognition system.

Hence, ingredient processing arrangement 40 includes a series of sensors for returning information to control unit 21 relating to the state of arrangement 40 and of the beverage preparation process. Communication between control unit 21 and beverage preparation 41 is achieved via a bidirectional communication channel 421.

Furthermore, beverage preparation machine 1 has a communication module 11 for bidirectional communication with an external network 511, such as the internet or an intranet. Communication module 11 is connected to a user-interface 101, preferably in the form of the above mentioned display 10, preferably a touch screen, and possibly one or more buttons 12, via a bidirectional data communication channel 111. Display 10 in case of a touch screen may be operated by finger touch or by way of the stylus 15.

Control unit 11, communication module 21 and ingredient processing arrangement 40 are all contained within the housing of beverage preparation machine 1.

In accordance with the invention, communication module 11 is permanently prevented from controlling the processing of the beverage ingredients. In other words, communication module 11 of beverage preparation machine 1 may not act directly or indirectly via control unit 21 on arrangement 40 or affect the beverage preparation process or other processes carried out by arrangement 40.

Control unit 21 is prevented from accepting beverage preparation-related control data from communication module 11.

In the architecture of FIG. 3, the control unit 21 is arranged to communicate data to communication module 11 via unidirectional data communication channel 211. With the exception of a request for information and the signals necessary to ensure proper communication, e.g. data transmission control signals, control unit 21 will not receive any data from communication module 11. Conversely, the data transferred from control unit 21 to communication module 11 may relate to at least one of: the beverage preparation process; ingredient processing arrangement 40; beverage preparation settings stored in control unit 21; and/or the state of control unit 21, e.g. in the view of identifying any malfunctioning at a station 50 remotely connected to network 511.

It is also possible to connect communication module 11 directly to the sensors in the beverage preparation module 40. Likewise, communication between beverage preparation module 40 and communication module 11 is unidirectional via bus 411. However, this communication channel may become redundant if the data relating to the beverage preparation module 40 can be communicated to the communication module 11 via control unit 21. Communication channel 411 is particularly useful in the absence of communication channel 211, for instance when the control unit 21 should benefit from an increased protection against network 511.

Communication module 11 is arranged to receive from said network and communicate via user-communication interface, such as display 10 and/or loudspeaker, information relating to at least one of: a need to carry out a particular service, e.g. descaling; a need to repair said machine; and information on a particular ingredient that is being processed in said machine. For such information to be sent to communication module 11, corresponding information is first gathered together by communication module 21 from control unit 21 and/or ingredient processing arrangement 40 and sent to a remote server 50 that processes and analyses the information before returning, when appropriate warnings or other information to communication module 11 via network 511.

In another embodiment, control unit 21 is prevented from communicating at all with communication module 11, not even unidirectionally. There is no data communication channel between control unit 21 and communication module 11.

The highest degree of safety is achieved when communication module 11 is connected neither to control unit 21 nor to beverage preparation module 40. A slightly inferior protection is achieved when communication module 11 is allowed to read, via a unidirectional channel, sensors of beverage preparation module 40. A still lower safety is obtained when communication module is allowed to obtain information from control unit 21. To ensure immunity against any upsetting of ingredient processing arrangement 40 and the control unit 21 via network 511, the possibility, in particular any physical possibility, for communication module 11 to change parameters of the control unit 21 or beverage preparation unit 40 should be avoided.

As shown in FIGS. 1a and 1b beverage preparation user-interface 201 is flush with communication user-interface 101 and implemented as a combination of display 10, buttons 12, holes 31 comprising LEDs or the like, loudspeakers, microphones or the like.

A master switch for the machine 1 is also provided (not shown in the Figures). The master switch is arranged to connect and disconnect the powering of the various components of the beverage preparation machine, including communication module 11, control unit 21 and ingredient processing arrangement 40 all powered by the same power source, typically the mains.

Generally, communication module 11 can be arranged to receive from the network 511 and communicate via user-communication interface, such as a display 10 and/or loudspeaker, information relating to: handling of such machine 1 by a user; advertising relating to such machine 1 or related machines, accessories, and/or one or more ingredients for the beverage processing; general information relating to one or more ingredients for the beverage processing; visualization and/or music for generating an ambiance relating to said beverage or preparation thereof or consumption thereof; and news and/or weather forecast.

Figure 4:
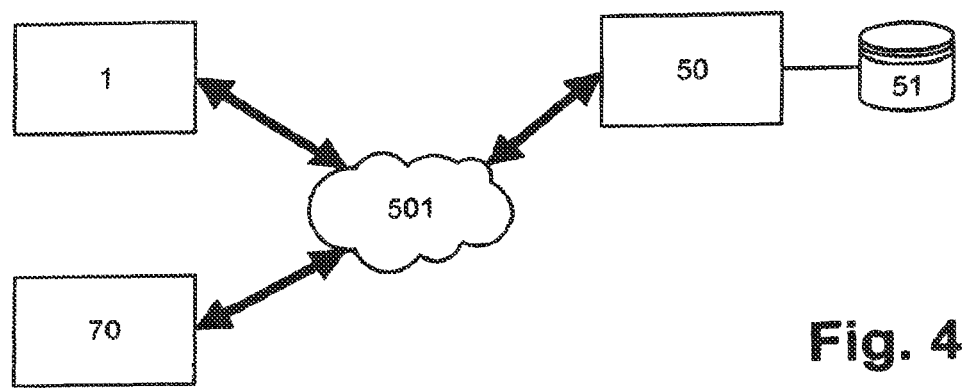
FIG. 4 shows a block diagram showing schematically the functional architecture of a network comprising a beverage preparation machine according to the present invention.

FIG. 4 shows a network comprising a machine 1 according to the present invention having network capabilities. Connected to the communication network 501 is also a server 50, which for example can be associated to a capsule supplier. The server 50 can be further connected to a database 51 comprising data on users, capsules, machines, capsule consumption or the like.

A user device 70 can further be connected to the network 501. Such a user device 70 can for example be a notebook, PC, mobile phone, PDA or any other user device having network communication capabilities.

Via the user device 70 the user can for example submit data, programs or information to the machine 1. For example he can load new or updated software or data into the machine 1. He can also change the settings of the machine remotely. Depending on the degree of communication possibilities between the control module 21 and the communication module 11, the user can also remotely start, stop or change a beverage preparation process. The user via the user device 70 can also log into the server 50 in order to change his personal user configurations, to submit a capsule order, to send a request for support or information or the like.

Even though in FIG. 4 the network 501 is shown as one single network connecting the machine 1, the server 50 and the user device 70, it is also possible that the different devices communicate via one or more separate network. Any type of network can be possible including a public or a private network, for example via Bluetooth, infrared, GSM, UMTS, internet or any other type of wired or wireless communication network. Specifically, an intermediate device such as a telemetry device can be provided between the machine 1 and the network 501 in order to convert the corresponding data which are transmitted. The communication between respectively two of the devices, i. e. the machine 1, the server 50 and the user device 70 can be one- or bidirectional.

Figure 6:
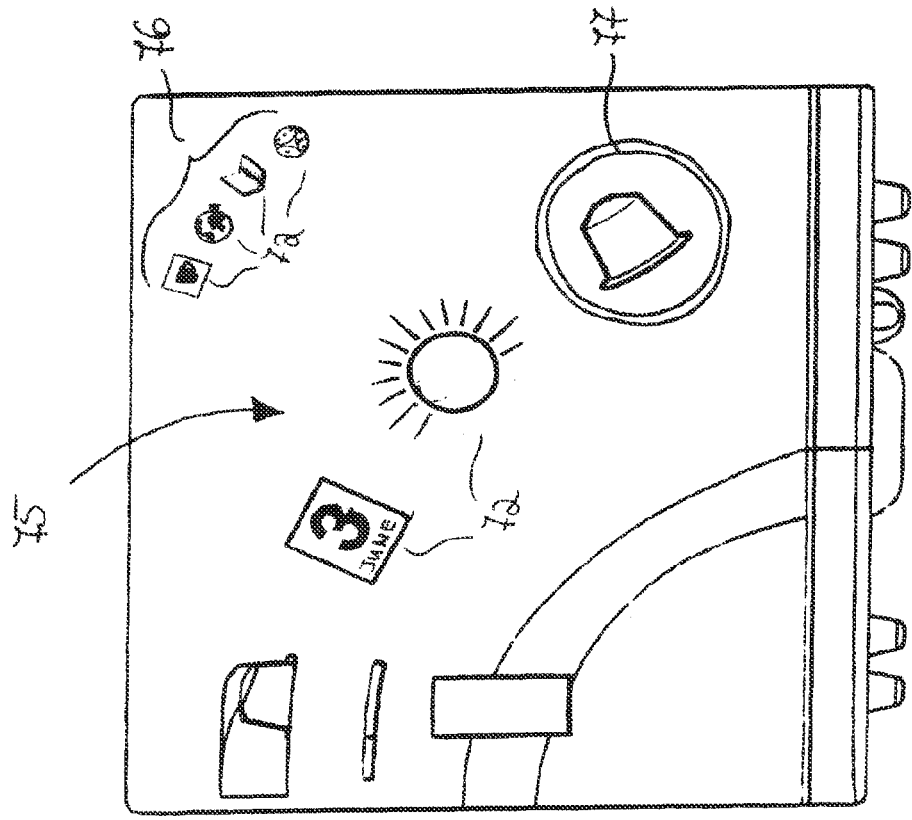
Figure 5:
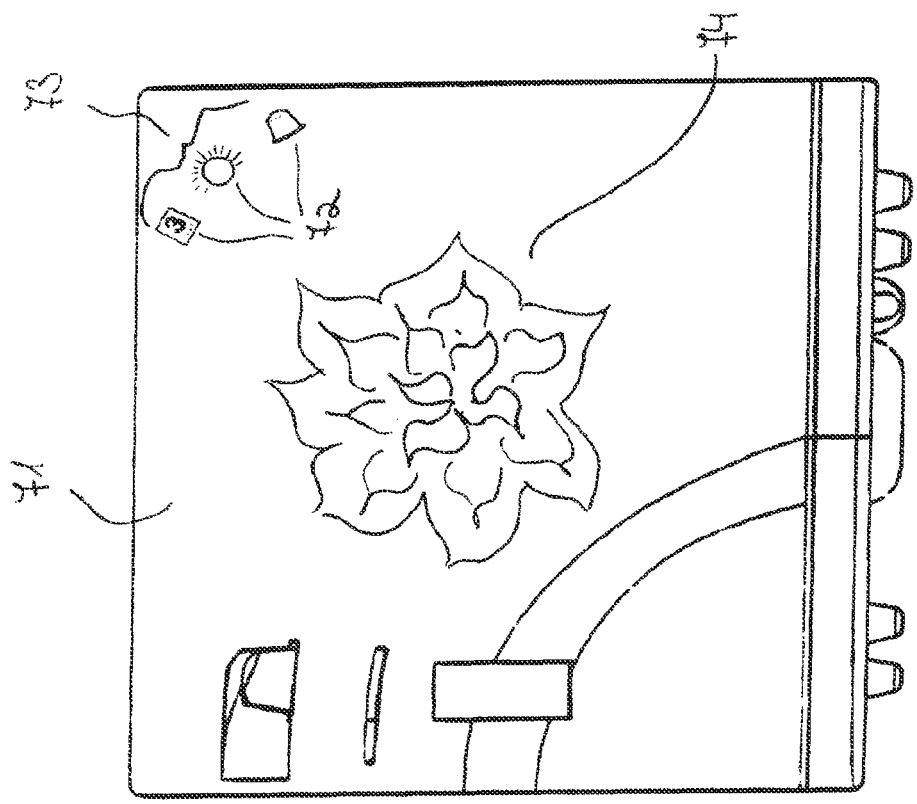

With reference to FIGS. 5 to 7 now the menu structure and the steps of operating the same according to the present invention is explained in more detail. Hereby, each of the FIGS. 5 to 7 shows a front view of the machine 1, i. e. a view on the display 10. Also schematically indicated are the buttons 12, the capsule inlet 32 and the handle 41. The stylus 15 is omitted for the sake of clarity in the FIGS. 5 to 7.

On the display area 71 there can be displayed several images, symbols, icons or the like. The display can be any type of display and can also be a combination of a display and a touch pad, i. e. a touch screen. Provided within the display area 71 as schematically shown in the Figures there can be provided one or more buttons 12 and also LEDs, as has been previously described.

According to the present invention the display 10 is adapted to display at least two icons 72, whereby each icon indicates a selectable menu function of the machine 1.

Several non-limiting examples for such icons are shown on the display area 71 in FIG. 7. The car group indicates the function of traffic news, the stars indicate the function of a sky map, the watch indicates the function of time optionally also of world time comprising different time zones, the cup indicates the function of setting the beverage preparation parameters, the globe indicates different communication possibilities such as setting a WiFi or any other communication connection, connecting to the Nespresso Club or joining a forum, the book indicates an e-book function, the die indicates the game function, the calendar sheet indicates an agenda, the sun indicates weather news and the capsule indicates setting up connection to the shop for ordering new capsules or other accessories for the machine 1.

The icons 72, which provide different menu functions, according to the present invention are divided into at least two menu level groups. In other words, a first menu level is composed of a first group of icons and at least one further menu level is composed of another group of icons. Hereby, every icon can be included only into one group or can be part of several groups. Every machine 1 when powered on for the first time has a default setting for dividing the icons into the at least two groups. Depending on parameters input by the consumer and/or on other parameters, as will be explained later on, the allocation of icons to different groups can be changed.

According to the present invention, there are two operation modes. In a first operation mode as shown in FIG. 5 on the main portion 75 of the display 10, i.e. on a portion extending over the majority of the display 10, an arbitrary image 74 or no image is displayed. This image 74 can either be any type of still or moving graphical image, a foto, an agenda entry, news, information on the actually prepared beverage or the like. In this first operation there is also displayed a group 73 of icons 72 adjacent to the main portion 75.

In the second operation mode as shown in FIG. 6, the image 74 is not displayed anymore but rather a group 73 of icons is displayed on the main portion 75. Hereby, the group 73 of icons displayed on the main portion are the icons or functions which are currently selectable. In the second operation mode, it is possible to switch between different group of icons displayed on the main portion and thus being selectable.

In the second operation mode, one group of icons is always displayed on the display as currently selectable icons, that is as currently selectable menu functions. Hereby, the currently selectable group is displayed on the main portion 75. The size of the icons 72 can be changed between the first operation mode and the second operation mode, i.e. the icons in the second operation mode can be displayed larger than in the first operation mode to indicate that the large size icons 72 are currently selectable and the small size icons currently are not selectable.

As already described, the machine 1 provides a touch pad 22, which can be provided either on top of the machine or on any other part or which can be integrated into the display 10, so that the combination of display 10 and touch pad is a touch screen. It is also possible to provide a touch screen and in addition a touch pad 22 on the housing of the machine 1.

When the user carries out a touch operation on the touch pad with his hands, with a stylus or any other means, then this touch operation will be detected and the control unit 21 will make the display either switch between the first operation mode and the second operation mode or the control unit 21 during the second operation mode will make the display 10 change the group of icons 72 displayed as currently selectable.

FIG. 5 shows a first view of the display 71 of the machine 1 according to the first operation mode according to the present invention. Shown on the display is a group 73 of icons 72. On the main portion 75 of the display 71 there is shown an image 74, which can be any kind of image providing enchantment, mood animation and/or information about the coffee that is being brewed. In this case the first group 73 of icons 72 is displayed to provide the possibility to shift the group to the main portion 74 by a corresponding touch operation.

According to a preferred embodiment, directly after the machine 1 is powered on or when the machine 1 have been idle for a while, then automatically the first mode of operation is selected and a predefined first group of icons 73 is shown on the display 71 together with the image 74. Hereby, as shown in FIG. 5, the group of icons 73 can be shown with a small size.

The image 74 can be a passive mode, i. e. a mood feature with different scenarios. It could be a mood animation with different patterns, a message left in the diary, i. e. a sort of post-it note area or a specific animation related to the coffee that is being brewed. For example, as soon as the user inserts a capsule, the capsule detector sends to the controller 20 the information about the capsule. Instantly, the animation is on with a corresponding display and possibly LEDs preferably around the cup area and information or animation related to the very capsule.

When switching between the first and second operation as well as when changing in the second operation mode the group of icons 72 displayed on the main portion 75, preferably the control unit 21 operates the display in such a way, that a movement of the one or more group of icons 72 is shown on the display 10.

More specifically, in the first operation mode a first group 73 of icons 72 is shown on the display. When switching to the second operation mode, the image 74 will disappear and the group 73 of icons will move to the main portion 75 of the display 10. Preferably, together with the movement of the group 73 also an enlarging operation of the group 73 is accomplished, so that the group 73 on the main portion 75 is displayed larger than in the first operation mode.

Otherwise, when changing the group of icons 72 in the main portion 75 of the display within the second operation mode, then the currently displayed group 73 will move from the main portion 75 to a side portion of the display or will disappear. Likewise, the group which is intended to be displayed instead of the first group on the main portion 75, will appear on a side portion of the display and then move to the main portion 75 of the display.

In the second operation mode the user can change the display 10 by a corresponding touch operation and thereby change the group of icons which is displayed as currently selectable in the main portion 75.

To summarize, for indicating that in the second operation mode icons 72 of a group are currently selectable, the following options are present: displaying only one single group on the display 10 on the main portion, displaying the group 73 of selectable icons within the main portion of the display and/or displaying the group 73 of icons 72 which are selectable larger than other groups of icons on the display.

For finally selecting the function of an icon within the group of selectable icons 72, in case of a touch screen either a direct touch on the respective icon functions as selection and makes the machine 1 to provide the corresponding function. Alternatively, as shown in FIG. 6, a selection indicator 77 can be provided, for example a highlighting around an icon 72, indicating that this icon is currently selected. The selection indicator 77 can be moved within the group 73 of currently selectable icons to another icon 72. By performing a corresponding push operation on the touch pad or by pressing a corresponding button, the function of the selected icon is provided.

The allocation of icons 72 to different groups 73, 76, 78 may depend on an actual or expected frequency of selection of each icon by a user. The menu level groups 73, 76, 78 can be organized into a level hierarchy, in particular a visual and/or accessibility hierarchy, reflecting the actual or expected frequency of selection of each icon by a user. Hence, groups with icons relating to functions that have a higher intensity of use may be made more accessibly, either by way of visual presentation (e.g. being made visually predominant) and/or by way of user-selectability (e.g. requiring less effort by a user to be selected).

For example, a hierarchical level group 78, 76 of higher visibility and/or accessibility includes at least one icon 72 associated with a machine function selected from ambiance animation and information of a beverage that is being brewed. In another example, a hierarchical level group 73, 76 of lower visibility and/or accessibility includes at least one icon 72 associated with a machine function selected from on-line shopping, recipe tutorial, diary, news, message board, club services, butler services and blend library.

The allocation of icons 72 to different groups can be dynamically changed. For example, the user himself can change the allocation of icons to different groups according to his preferences. Alternatively or additionally, the machine 1 monitors for each icon the frequency of selection by a user. The allocation of icons to different groups is then changed according to the frequency of selection by the user. For example, a first group comprises the icons being selected most likely to be selected by the user and the other groups of icons comprise icons which are less likely to be selected by a user.

Alternatively, instead of changing the allocation to groups, the icons 72 having a higher frequency of selection can be displayed larger on the display 10 than icons 72 having a lower frequency of selection.

A further possibility is to change the allocation and/or the size of the icons 72 on the display 10 depending on the actual date, the actual time, an agenda of the user stored within the machine, the type of produced beverage and/or personal settings.

In the following the touch operations carried out by the user in order to change the group of selectable icons will be explained in more detail in the following. The following description hereby, if not stated otherwise, refers to the case of a touch screen as well as to the case of an external touch pad being separated from the display 10.

A first mechanism for making the control unit 21 and the display 10 to shift a group of icons 72 on the display 10 will be explained with reference to FIG. 7. On the display example of FIG. 7 three groups 73, 76 and 78 of icons are shown on the display. In the present example the currently selectable icons is the second group 76. This is indicated by displaying the second group 76 within the main portion 75 of the display and optionally by displaying the icons 72 of this group with a larger size.

A first possibility is that the touch operation is carried out as sliding operation along the touch pad. The machine 1 thereby detects the direction of the sliding operation and changes the group of selectable icons in accordance with the sliding direction. For example, the icons are divided into at least two groups, preferably into three groups 73, 76 and 78 as shown in FIG. 7. If the direction of the sliding operation is detected into a first direction, then the display is changed from a first group to a second group. If the sliding direction is in a second direction opposite to said first direction, then the display of groups is changed from the second group to the first group.

More concretely, a sort of ranking or prioritization can be assigned to the different groups. As schematically indicated in FIG. 7, with corresponding arrows L and H, the groups in one direction have a higher priority indicated with arrow H, and the groups in the other direction have a lower priority, indicated with arrow L. A sliding operation into a first direction thereby changes the display from higher prioritized group to a lower prioritized group and a sliding direction into a second direction opposite to said first direction changes the display from a lower prioritized group to a higher prioritized group.

In case that the touch pad is an integrated touch screen, then two different allocations of sliding directions to the group changing directions are possible. In a first possibility if the user is carrying out the touch operation in direction of a lower prioritized group, then this lower prioritized group will be displayed as currently selectable. Alternatively, if the user is carrying out the sliding operation in direction of the lower prioritized group, then the next higher prioritized group is displayed.

The same mechanism can also be used for switching from the first operation mode to the second operation mode, i.e. to shift the group of icons displayed on a side portion in the first operation to the main portion 75.

Alternatively, instead of detecting the sliding direction, it is also possible to detect the duration of the touch operation on the touch pad. As already described, different priorities or rankings can be assigned to the different groups. If now the duration of the touch operation is detected, then the group of icons to be displayed as selectable icons is selected depending on the duration of the touch operation. For example, the longer the duration, the lower is the priority of the group of icons displayed as selectable icons.

When the group of selectable icons is changed on the display, then this can either be done by displaying the icons as sliding on the display, so that the icons are moving from a first to a second position or a constantly changing in size or alternatively a changed image with a changed size and/or position of the icon can be instantaneously displayed without any intermediate images.

Figure 8:
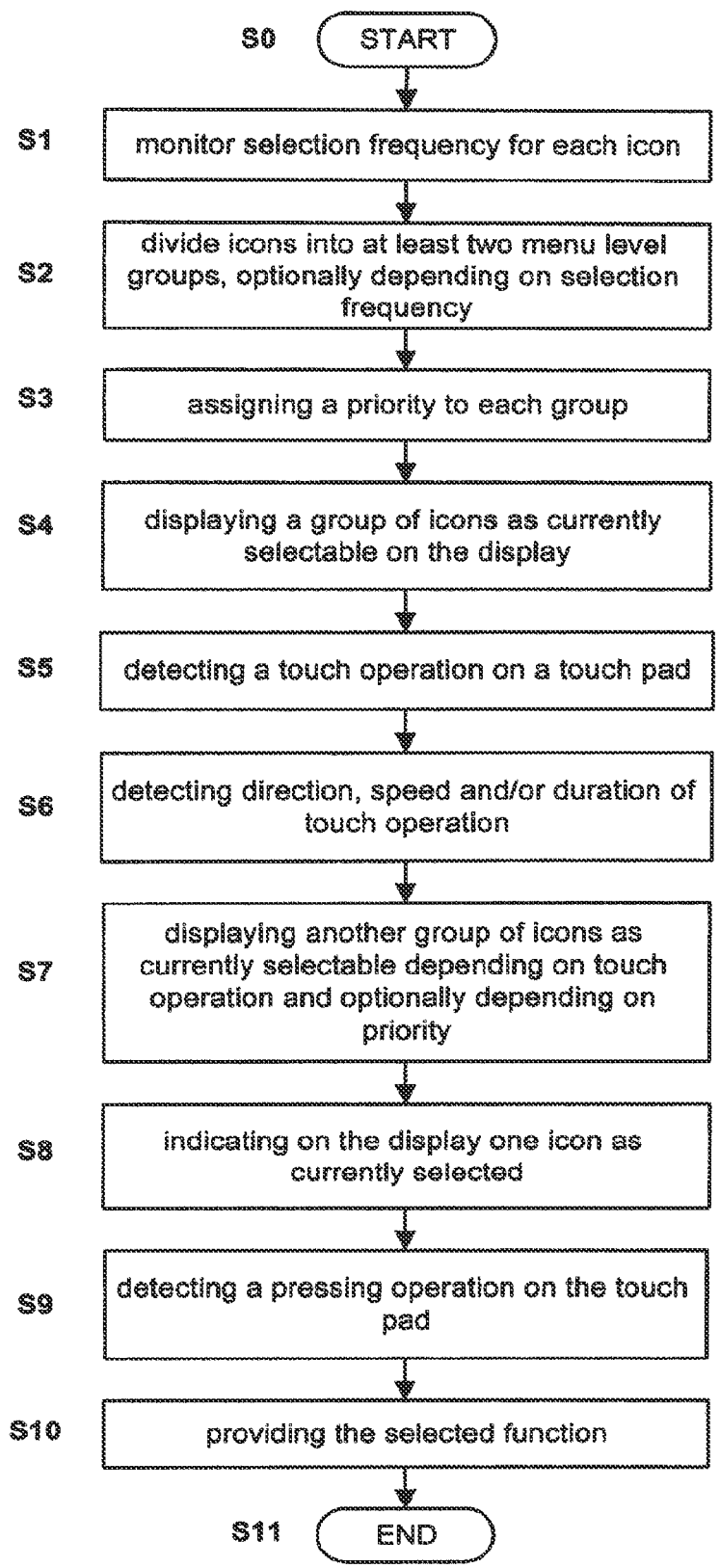
FIG. 8 is a flowchart showing the process steps of the method according to the present invention.

In the following, the method of the present invention will again be displayed with reference to FIG. 8. Hereby, the mechanism within the second operation for changing the group of icons 72 on the main portion 75 will be explained.

The process starts in step S0. In step S1 the selection frequency for each icon is monitored. In step S2 the icons are divided into at least two menu level groups, optionally depending on the selection frequency. In step S3 a priority is assigned to each group. In step S4 a group of icons is displayed as currently selectable on the main portion 75 of the display 10. In step S5 a touch operation on a touch pad is detected. In step S6 the direction, speed and/or duration of the touch operation is detected. In step S7 another group of icons is displayed as currently selectable on the main portion 75 depending on the touch operation and optionally depending on the priority. In step S8 one icon as currently selected is indicated on the display. In step S9 a pressing operation on the touch pad is detected. In step S10 the selected function is provided. The process ends in step S11.

With the present invention thus a very intuitive menu structure is provided, which can be easily adapted to the needs and behavior of the user. Further, the change between the different menu levels and the selection of functions is very easy and intuitive for the user.

The invention is claimed as follows:

1. A beverage preparation machine comprising:
   a liquid supply reservoir connected to a liquid circulation circuit comprising a pump, a heater and a brewing unit;
   a memory configured to store icons divided into at least two menu level groups, each icon indicating a selectable menu function of the beverage preparation machine;
   a display configured to display:
   in a first operation mode, a first group of icons in a position adjacent a main portion of the display, and
   in a second operation mode, a group of currently selectable icons on the main portion of the display, the display delimiting and extending into at least one opening configured for a function selected from the group consisting of inserting an ingredient, providing access to a beverage outlet, and combinations thereof; and
   a touch pad for accepting a touch operation for switching between the first and second operation mode.

2. The beverage preparation machine of claim 1 wherein the brewing unit is connected to a handle pivotally mounted to a housing of the beverage preparation machine to allow introduction, extraction and removal of a capsule containing a beverage ingredient.

3. The beverage preparation machine of claim 1 wherein, in the first operation mode, the main portion is empty or displays an image that is different than the icons.

4. The beverage preparation machine of claim 1 wherein, in the first operation mode, the main portion displays an image that is different than the icons; and the image is absent from the main portion in the second operation mode.

5. The beverage preparation machine of claim 1 wherein, in the first operation mode, the touch pad is configured to accept a first user input requesting group movement; and the display in the second mode displays the first group of icons as the group of currently selectable icons in response to the first user input, by moving the first group of icons to the main portion of the display from the position adjacent the main portion of the display.

6. The beverage preparation machine of claim 5 wherein the first group of icons are larger in size when displayed as the group of currently selectable icons relative to when displayed in the position adjacent the main portion of the display.

7. The beverage preparation machine of claim 5 wherein the first user input is a sliding touch between the position adjacent the main portion of the display and the main portion of the display.

8. The beverage preparation machine of claim 5 wherein, in the second operation mode, a second group of icons replaces the first group of icons at the position adjacent the main portion of the display.

9. The beverage preparation machine of claim 8 wherein, in the second operation mode, the touch pad is configured to accept a second user input requesting group movement; and the display in the second mode replaces the first group of icons with the second group of icons as the group of currently selectable icons in response to the second user input.

10. The beverage preparation machine of claim 9 wherein the display moves the first group of icons from the main portion to the position adjacent the main portion in response to the second user input.

11. The beverage preparation machine of claim 9 wherein the first group of icons are removed from the display in response to the second user input.

12. The beverage preparation machine of claim 1 wherein the beverage preparation machine is configured to allocate a first icon into the first group based on a frequency of selection of the first icon.

13. The beverage preparation machine of claim 1 wherein the beverage preparation machine is configured to allocate a first icon into the first group based on a user input received by the touch pad directing allocation of the first icon into the first group.

14. The beverage preparation machine of claim 1 wherein the touch pad in the second operation mode is configured to accept a touch operation indicating a selection of one of the group of currently selectable icons, and a control unit is adapted to initiate a function corresponding to the selection.

15. A beverage preparation machine comprising:
   a liquid reservoir connected to a liquid circulation circuit comprising a pump, a heater and a brewing unit;
   a display delimiting and extending into at least one opening configured for a function selected from the group consisting of inserting an ingredient, providing access to a beverage outlet, and combinations thereof;
   a touch pad; and
   a control unit configured to support a program providing touch menu functionality, the program arranged to perform, when the program is executed, the steps of:
   dividing icons into at least two menu level groups, each icon indicating a selectable menu function of the machine;
   in a first operation mode, displaying a first group of icons adjacent a main portion of the display;
   in a second operation mode, displaying a group of currently selectable icons on the main portion of the display; and
   accepting a touch operation on a touch pad and switching between the first and second operation modes in response to the touch operation.

16. A method comprising:
   displaying a first group of icons as a group of currently selectable icons on a main portion of a display of a beverage preparation machine that comprises a liquid supply reservoir connected to a liquid circulation circuit comprising a pump, a heater and a brewing unit, the display delimiting and extending into at least one opening configured for a function selected from the group consisting of inserting an ingredient, providing access to a beverage outlet, and combinations thereof;
   detecting a touch operation on a touch pad;
   determining a characteristic of the touch operation selected from the group consisting of a direction, a speed, a duration, and combinations thereof;
   replacing the first group of icons with a second group of icons as the group of currently selectable icons displayed on the main portion, the second group of icons is at least partially based on the characteristic of the touch operation;
   detecting a pressing operation on the touch pad that identifies one currently selectable icon from the group of currently selectable icons; and
   providing a function corresponding to the one currently selectable icon identified by the pressing operation.

17. The method of claim 16, wherein a function of at least one icon of the first and second groups of icons comprises setting a beverage preparation parameter.

18. The method of claim 16, wherein a function of at least one icon of the first and second groups of icons comprises ordering directly through the beverage preparation machine a liquid food or beverage ingredient that is missing or at a level below a threshold.

19. The method of claim 16, comprising receiving a capsule containing ground coffee, extracting the ground coffee using the brewing unit, and evacuating the capsule to a used capsule collector of the beverage preparation machine.

* * * * *